April 14, 1970 TOSHIYA ODA ET AL 3,506,462
ELECTROLESS GOLD PLATING SOLUTIONS
Filed Oct. 24, 1967
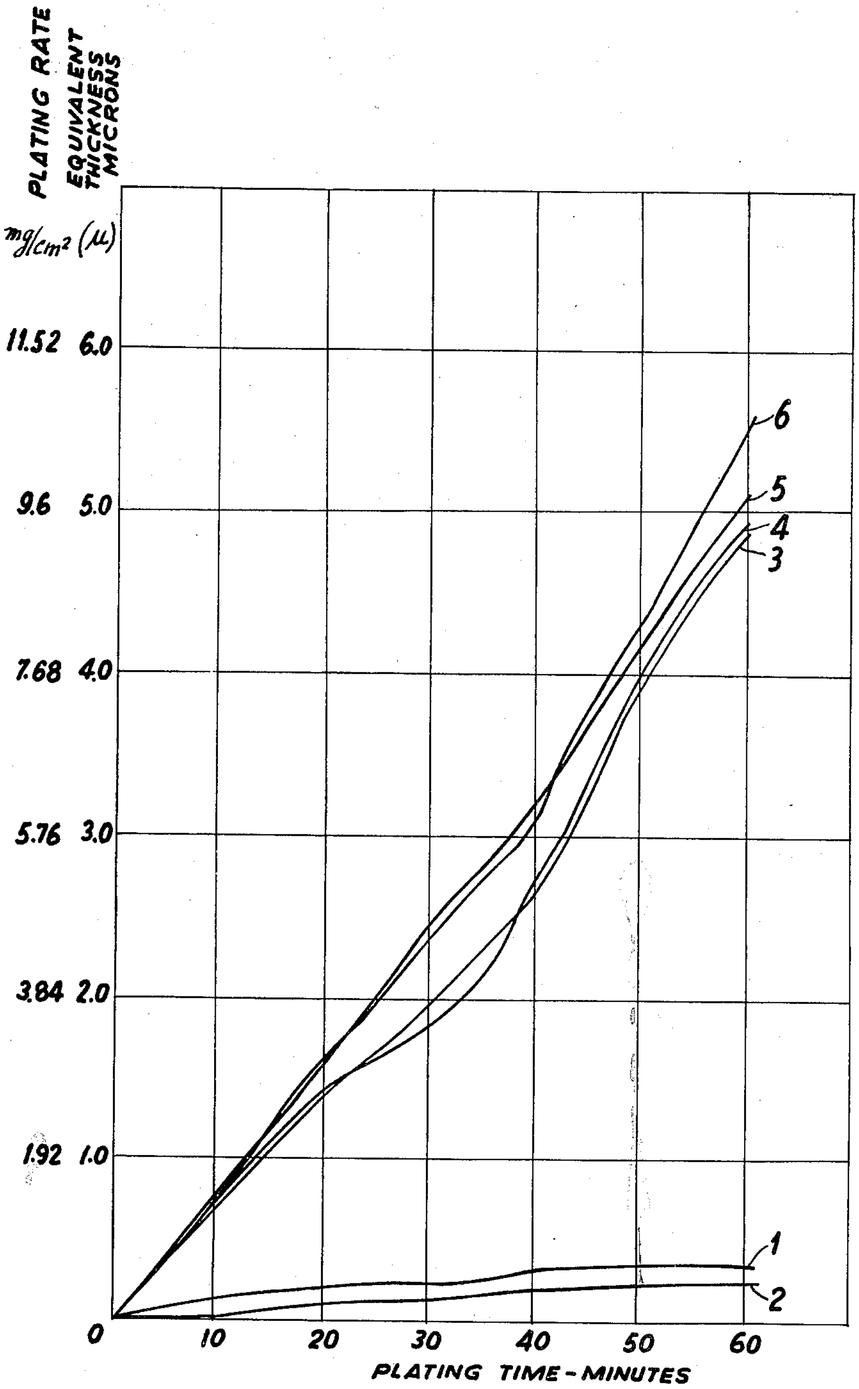
INVENTORS
TOSHIYA ODA
KAZUTAMI HAYASGI
BY
Hopgood & Calimafde
ATTORNEYS 3,506,462

ELECTROLESS GOLD PLATING SOLUTIONS

Toshiya Oda and Kazutami Hayashi, Tokyo, Japan, assignors to Nippon Electric Company, Limited, Tokyo, Japan Filed Oct. 24, 1967, Ser. No. 677,582
Claims priority, application Japan, Oct. 29, 1966, 41/71,246
Int. Cl. C23c 3/00
U.S. Cl. 106—1 4 Claims

ABSTRACT OF THE DISCLOSURE

The plating rate from electroless gold plating cyanide baths is improved by using a particular combination of a catalyzer, such as cobalt chloride, and a complexing agent, such as thiourea.

This invention relates to what have been commonly called "electroless gold plating solutions" or "immersion gold baths" and more particularly to new and improved electroless gold plating solutions containing a particular combination of a catalyzer and a complexing agent and capable of high rates of gold deposition on metallic substrates.

It has been a well establish fact that electroless gold plating is substantially a process in which "displacement" plating occurs due to the ionization tendency of metals. Most common electroless gold plating methods that have been known feature use of baths comprised of potassium gold cyanide as the gold supplier, a complexing agent and a chelate compound, both of which are effective for gold deposition, an ammonium salt of an organic acid or an ammonium hydroxide salt as a pH buffer, etc. These methods have an advantage in common that gold can be uniformly deposited all over the surfaces of substrate material regardless of the geometrical configuration of the substrate, which accounts for the reason why the application field of these methods has been extended lately to cover semiconductor technology which manifests remarkable development in recent years.

It is known among those skilled in this technical field, however, that this advantage has been considerably offset in the following drawbacks as viewed from chemical reactions in conventional electroless gold baths:

As gold deposition on the substrate surface proceeds, the deposition rate rapidly slows down and no sooner than the entire surface is covered with gold, the so-called local cell action between the plating liquid and the substrate surface dies away and hence, the deposition ceases; and since no more gold deposition can be expected, the obtaining of heavier deposits become practically impossible. This slowing down of gold plating speed, i.e. weight of gold deposited per unit time, has impeded or restricted applications and economical use of conventional electroless gold baths whenever bath stability and life are taken into consideration.

In recent years, gold coatings have become increasingly important for semiconductor enclosures, metallic leads or parts to be bonded to semiconductor elements or enclosures, notably for shapes or in locations generally difficult to be plated, such as internal walls of hollow cylindrical enclosures, recessed portions, gaps, and the like. Because of the difficulty of obtaining thick gold plating, the conventional plating techniques could not satisfactorily meet the previously mentioned requirements.

Prior to this invention, thickness of gold coatings on semiconductor headers, for example, in accordance with conventional electroless plating methods, were restricted to the order of 0.3 micron at most. Thicknesses of this order were apparently insufficient for soldering semiconductor elements reliably thereon and also fell short of serving as corrosion-resistant coatings capable of withstanding exposure tests under conditions of both high temperature and humidity. Accordingly, neither good electrical conductivity nor solderability could be expected from such coatings deposited from conventional electroless gold baths.

It is thus an object of this invention to eliminate the defects inherent in conventional electroless gold plating solutions by providing improved solutions featuring chemical stability and long life.

Another object of this invention is to provide improved electroless gold plating solutions capable of depositing therefrom uniform, dense and sufficiently thick gold coatings on the basis metal surface within a brief plating period.

The bath formulations developed according to the principles of this invention may be expressed as follows:

Potassium gold cyanide—from about 1 to 10 g./l.
Thiourea—from about 0.5 to 100 g./l.
Ammonium citrate—from about 0.5 to 70 g./l.
Cobalt chloride—from about 15 to 30 g./l.

An important feature of this invention is based on the use of a combination of thiourea as the complexing as well as reducing agent and colbalt chloride as the catalyzer.

It has been experimentally verified that all baths prepared to meet these formulas can deposit uniform, dense, and heavy gold coatings on the substrate metal. The adoption of the combination of thiourea and cobalt chloride in our improved electroless gold baths is based on the discovery that the former can be used as an effective complexing agent, while the latter is particularly excellent over other chlorides as a compound for producing in an aqueous solution, catalytic metal ions for increasing the gold deposition rate and for exerting a favorable effect on the deposited gold purity and further, that extremely dense, adherent, pure and heavy deposits are obtained within a relatively short plating time interval by the correlation effect believed to be due to the two agents.

The reason why the content of cobalt chloride as the catilyzer is selected as about 15 to 30 g./l. is as follows:

Experiments have confirmed that cobalt chloride in amounts less than 15 g./l. does not have the desired catalyzing effect and hence, plating rate is markedly decreased. On the other hand, if the cobalt-chloride is in excess of about 30 g./l., plating rate is not additionally improved. Moreover, an increase in the amount of cobalt chloride in a bath increases the chlorine ion concentration which retards considerably the rate of gold deposition.

We find it advantageous to maintain the content of potassium gold cyanide at about 1.0 to 10 g./l. for the reason that it is very difficult to obtain thick gold plating with amounts of the gold salt below 1 g./l. Moreover, lower amounts of the gold salt shortens bath life. With regard to higher amounts of gold salt, no particular improvement in plating thickness or bath life is observed if the amount is increased in excess of about 10 g./l. and furthermore, increasing the amount of gold in solution above 10 g./l. is not economically justifiable.

The selection of the amounts of thiourea and ammonium citrate at about 0.5 to 100 g./l. and about 0.5 to 70 g./l., respectively, is based on the observation that when the content of each was maintained below 0.5 g./l., the gold deposition rate decreased and high plating rates of gold could not be attained within a brief time interval. Further, the bath life was shortened beyond regeneration. Obviously, this is disadvantageous in plating work. Increasing the amounts of both in excess of the indicated upper limits did not provide any appreciable beneficial effect on gold deposition rate as compared with the lesser amounts. Also working above the upper limits was found to be disadvantageous for economic reasons.

The foregoing features of the invention may best be understood by reference to the following description taken in conjunction with the accompanying drawing.

Referring now to the drawing, curve 1 denotes relationship between immersion time and weight or equivalent thickness of gold deposited on specimens of nickel plate, 1 cm. square in area, from a typical, conventional electroless gold bath currently procurable from market and containing a complexing compound. Curve 2 denotes similar relationship when the same bath was used for gold plating of 1 cm. square Kovar plate specimens (an alloy comprising about 29% Ni, 17% Co and balance Fe).

In contrast, curves 3 and 4 denote respectively similar relationship as mentioned previously when two typical, improved gold baths according to this invention were used for nickel plate specimens with the same dimensions, whereas curves 5 and 6 denote respectively similar relationship when two typical, improved gold baths according to this invention were used for dipping thereinto Kovar specimens with the same dimensions. (The same baths were used respectively for curves 3 and 5 and curves 4 and 6.)

A comparison between these two curve families will readily reveal excellence of the electroless gold baths prepared according to this invention over the conventional. Our investigation has demonstrated that the effect of this invention can be obtained with substantially all immersion gold baths having the following formulas: potassium gold cyanide about 1 to 10 g./l., thiourea about 0.5 to 100 g./l., ammonium citrate about 0.5 to 70 g./l., cobalt chloride about 15 to 30 g./l. These baths exhibited excellent chemical stability, provided gold deposits having excellent density and brightness and, moreover, were economical. Therefore, it is apparent that these baths have a wide field of application.

To aid in the further understanding of the objects, features and advantages of this invention, a detailed description of several embodiments are given as follows:

EMBODIMENT 1

Speciments of nickel and Kovar substrate plates, each 1 cm. square and 0.08 mm. thick, were degreased with a degreasing solution, the main constituent of which was orthosodium silicate. The specimens were then dipped into and washed in an aqueous solution of hydrochloric acid consisting of HCl and $H_2O$ in the ratio of 1:1 heated to a temperature of between 75° and 85° C. for 15 seconds.

The specimens were removed from the solution and then thoroughly washed in water. They were subsequently dipped into a bath prepared according to the following composition:

| | G./l. |
|---|---|
| Potassium gold cyanide | 5 |
| Thiourea | 25 |
| Ammonium citrate | 20 |
| Cobalt chloride | 30 |

After preparation of the bath and before dipping in the specimens, the pH of the bath was adjusted to about 6.5 by adding an aqueous solution of citric acid and/or ammonium hydroxide, while maintaining the bath temperature at a temperature of between 83° and 87° C. After introducing these specimens, the bath was kept vigorously stirred up. Curves 4 and 6 relate deposition rate to deposition time for plating times ranging up to one hour. In either case, heavy deposits are obtained as evidenced by these curves. The aging effect of this immersion gold bath was small and the bath could be used several times repeatedly, provided the pH adjustment is made prior to each plating process. The degree of slowing down of deposition rate with time of this bath was quite small as compared with conventional immersion gold baths (note the saturation tendency in curves 1 and 2), which accounts for the rather high capability for heavy deposits with this bath.

EMBODIMENT 2

The same pre-treatments as used in Embodiment 1 were employed for similar nickel and Kovar specimens with the same dimensions, after which the specimens were subjected to electroless plating in a bath having the following composition:

| | G./l. |
|---|---|
| Potassium gold cyanide | 5 |
| Thiourea | 20 |
| Ammonium citrate | 30 |
| Cobalt chloride | 15 |

Prior to dipping the specimens, the pH was adjusted to 7.0 by use of a 30% solution of citric acid and/or an ammonium hydroxide solution and the bath was maintained at a temperature between 85° and 90° C. Plating gold on the nickel and Kovar specimens for 60 minutes under the previously mentioned bath and plating conditions resulted in data represented by curves 3 and 5. Thicknesses of gold deposited were 2 microns and 4.5 microns at plating times of 30 and 60 minutes, respectively. In either case, lustrous and dense gold coatings were deposited on the substrate metal surface.

As is evident from Embodiments 1 and 2, an advantageous bath composition is one containing about 5 g./l. of potassium gold cyanide, about 20 to 25 g./l. of thiourea, about 20 to 30 g./l. of ammonium citrate and about 15 to 30 g./l. of cobalt chloride.

EMBODIMENT 3

This embodiment is concerned with a method for subjecting a semiconductor enclosure to an electroless gold plating process. The enclosure treated is a hollow cylindrical ceramic member, 3.2 mm. in internal diameter, 5.5 mm. in external diameter, and 4.0 mm. in height, both ends of which have been metallized. A circular Kovar sleeve member is attached to the bottom metallized surface of the ceramic cylindrical member and has an inwardly raised circular platform, 2.5 mm. in diameter, for mounting a semiconductor element thereon, a Kovar ring, 3.2 mm. in inner diameter and 6.0 mm. in outer diameter being soldered on the top of the metallized surface of the ceramic cylindrical member for the purpose of electric welding (or soldering) of a sleeve or a cap on the top surface of the Kovar ring. This enclosure was immersed into a bath with the same formula as mentioned in Embodiment 1 for 30 minutes to deposit gold on the circular platform and its peripheral parts as well as on the exposed substrate metal portions. The gold deposition on the circular platform was as thick as 2.5 microns, fully adherent to the Kovar substrate and extremely uniform and dense.

On heating at 390° C. after mounting a p-n junction silicon semiconductor element on the platform, the semiconductor element and the gold layer on the platform fused together with sufficient firmness. It was easy, then, to bond a lead of nickel (or copper) to the gold-plated outer bottom surface of the Kovar sleeve member by means of a lead-tin eutectic solder. A semiconductor device was then accomplished by hermetically sealing the assembled enclosure by electric welding or soldering. The resulting semiconductor device gave favorable performance for a long period of time and exhibited markedly improved high frequency characteristics as compared to similar devices gold-plated from conventional electroless gold plating baths.

It is apparent from the foregoing that markedly improved gold plating rates and thicknesses are achieved by employing in combination with a potassium gold cyanide bath effective amounts of thiourea and cobalt chloride. The effective amounts found advantageous for this invention range from about 0.5 to 100 g./l. of thiourea and 15 to 30 g./l. of cobalt chloride.

Incidentally, the conventional immersion gold solution (as shown by the curves 1 and 2 in the drawing) having used for the purpose of comparison in Embodiment 1 is "Atomex" (trade name) made by Englehard Industries, Inc., New Jersey, U.S.A., which we consider consists of potassium gold cyanide 5 g./l., ammonium citrate 20 g./l. and urea 25 g./l.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. An electroless gold-plating bath comprising essentially about 1 to 10 g./l. of potassium gold cyanide, about 0.5 to 70 g./l. of ammonium citrate, about 0.5 to 100 g./l. of thiourea and about 15 to 30 g./l. of cobalt chloride.

2. The gold plating bath of claim 1 wherein the bath is comprised of about 5 g./l. of potassium gold cyanide, about 20 to 30 g./l. of ammonium citrate, about 20 to 25 g./l. of thiourea and about 15 to 30 g./l. of cobalt chloride.

3. The method of improving plating rate and thickness of gold deposited from an electroless gold plating bath which comprises, establishing a bath comprising essentially about 1 to 10 g./l. of potassium gold cyanide, about 0.5 to 70 g./l. of ammonium citrate, about 0.5 to 100 g./l of thiourea and about 15 to 30 g./l. of cobalt chloride, and then contacting said bath with a metal substrate.

4. The method of claim 3, wherein the bath is established to comprise essentially about 5 g./l. of potassium gold cyanide, about 20 to 30 g./l. of ammonium citrate, about 20 to 25 g./l. of thiourea and about 15 to 30 g./l. of cobalt chloride.

References Cited

UNITED STATES PATENTS 3,147,154 9/1964 Cole et al. ------ 117—160 XR

FOREIGN PATENTS 720,734 11/1965 Canada.
1,022,061 3/1966 Great Britain.

JULIUS FROME, Primary Examiner

L. B. HAYES, Assistant Examiner

U.S. Cl. X.R.

117—47, 130, 160